(12) United States Patent
Katsura

(10) Patent No.: US 10,943,576 B2
(45) Date of Patent: Mar. 9, 2021

(54) SOUND ABSORBING MATERIAL

(71) Applicant: MAZDA MOTOR CORPORATION, Hiroshima (JP)

(72) Inventor: Daiji Katsura, Etajima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 446 days.

(21) Appl. No.: 15/763,078

(22) PCT Filed: Mar. 27, 2017

(86) PCT No.: PCT/JP2017/012472
§ 371 (c)(1),
(2) Date: Mar. 23, 2018

(87) PCT Pub. No.: WO2017/170447
PCT Pub. Date: Oct. 5, 2017

(65) Prior Publication Data
US 2018/0277088 A1 Sep. 27, 2018

(30) Foreign Application Priority Data
Mar. 31, 2016 (JP) .............................. JP2016-071088

(51) Int. Cl.
| | | |
|---|---|---|
| *G10K 11/168* | (2006.01) |
| *D06M 15/564* | (2006.01) |
| *C03C 25/1095* | (2018.01) |
| *D06M 15/423* | (2006.01) |
| *G10K 11/162* | (2006.01) |
| *D06M 15/693* | (2006.01) |
| *D06M 15/03* | (2006.01) |
| *C03C 25/326* | (2018.01) |
| *D04H 1/4218* | (2012.01) |
| *D04H 1/435* | (2012.01) |
| *D04H 1/46* | (2012.01) |
| *D06M 23/10* | (2006.01) |
| *D06M 101/32* | (2006.01) |

(52) U.S. Cl.
CPC ........ *G10K 11/168* (2013.01); *C03C 25/1095* (2013.01); *C03C 25/326* (2013.01); *D04H 1/4218* (2013.01); *D04H 1/435* (2013.01); *D04H 1/46* (2013.01); *D06M 15/03* (2013.01); *D06M 15/423* (2013.01); *D06M 15/564* (2013.01); *D06M 15/693* (2013.01); *D06M 23/10* (2013.01); *G10K 11/162* (2013.01); *D06M 2101/32* (2013.01); *D06M 2200/00* (2013.01)

(58) Field of Classification Search
CPC ............... G10K 11/168; G10K 11/162; C03C 25/1095; C03C 25/326; D04H 1/4218; D04H 1/435; D04H 1/46; D06M 15/03; D06M 15/423; D06M 15/564; D06M 15/693; D06M 23/10; D06M 2101/32; D06M 2200/00
See application file for complete search history.

(56) References Cited

U.S. PATENT DOCUMENTS

| 7,789,196 B2* | 9/2010 | Fukuhara | G10K 11/162 181/286 |
|---|---|---|---|
| 2008/0236936 A1 | 10/2008 | Niwa et al. | |
| 2015/0307701 A1* | 10/2015 | Croisier | C08L 23/36 524/528 |
| 2015/0361209 A1 | 12/2015 | Masuhara et al. | |
| 2019/0136044 A1* | 5/2019 | Oda | C08K 5/0016 |
| 2019/0311704 A1* | 10/2019 | Speros | C09D 7/61 |

FOREIGN PATENT DOCUMENTS

| EP | 2865570 A1 | 4/2015 |
|---|---|---|
| JP | 01178526 A * | 7/1989 |
| JP | H3-297633 A | 12/1991 |
| JP | H04-119236 A | 4/1992 |
| JP | 2004-217829 A | 8/2004 |
| JP | 2006-002257 A | 1/2006 |
| JP | 2006-2294 A | 1/2006 |
| JP | 2006-316089 A | 11/2006 |
| JP | 2007-34254 A | 2/2007 |
| JP | 2008-146001 A | 6/2008 |
| JP | 2008-248866 A | 10/2008 |
| JP | 2012-251661 A | 12/2012 |
| JP | 2013-159654 A | 8/2013 |
| WO | 2014/112234 A1 | 7/2014 |

OTHER PUBLICATIONS

A 1st Office Action; "Notification of Reasons for Refusal," issued by the Japanese Patent Office dated Oct. 24, 2017, which corresponds to Japanese Patent Application No. 2016-071088 and is related to U.S. Appl. No. 15/763,078; with English Translation.
A 2nd Office Action; "Notification of Reasons for Refusal," issued by the Japanese Patent Office dated Apr. 3, 2018, which corresponds to Japanese Patent Application No. 2016-071088 and is related to U.S. Appl. No. 15/763,078; with English Translation.
A Submission of Pulication was filed with the Japanese Patent Office on Apr. 25, 2018, which corresponds to Japanese Patent Application No. 2016-071088 and is related to U.S. Appl. No. 15/763,078; with English Translation.
International Search Report issued in PCT/JP2017/012472; dated Jun. 13, 2017.

* cited by examiner

Primary Examiner — Jeremy A Luks
(74) Attorney, Agent, or Firm — Studebaker & Brackett PC

(57) ABSTRACT

A sound absorbing material includes a fiber group of inorganic fibers, a fiber group of organic fibers, or a fiber group of a fiber blend including the inorganic and organic fibers. In the fiber group, at least junctions between the fibers are coated with a polymeric coating film having a loss factor of 0.1 or more.

20 Claims, No Drawings

SOUND ABSORBING MATERIAL

TECHNICAL FIELD

The present invention relates to a sound absorbing material.

BACKGROUND ART

There have been demands for vehicles, such as automobiles and trains, to be both lightweight and quiet. In order to ensure the quietness of a vehicle, a sound absorbing material which absorbs sounds from outside is attached to the walls, floor, and ceiling of the vehicle. Such a sound absorbing material for a vehicle, in particular, for an automobile, is required to absorb sounds of a wide frequency range from low to high frequencies. Due to its properties, the sound absorbing material needs to have a certain thickness in a direction in which low and intermediate frequency sounds enter the sound absorbing material to be capable of absorbing the low and intermediate frequency sounds. On the other hand, to make a passenger compartment more spacious, the sound absorbing material needs to be thin while being capable of absorbing the low and intermediate frequency sounds.

Known sound absorbing materials include nonwoven fabrics consisting of organic fibers, such as THINSULATE (a product of 3M). These sound absorbing materials made of the nonwoven fabrics can be formed to be relatively thin, but have insufficient sound absorbability.

Meanwhile, it has been reported that a wet-process nonwoven glass fabric does not decrease in tension strength when used as a decorative laminated sheet. This glass nonwoven fabric includes glass fibers and a binder component joining the glass fibers together, and the binder contains a rubber component and a component having sulfur atoms (Patent Document 1).

CITATION LIST

Patent Document

Patent Document 1: Japanese Unexamined Patent Publication No. 2006-002257

SUMMARY OF THE INVENTION

Technical Problem

The present inventor has made the following findings:
(1) A nonwoven fabric consisting of inorganic fibers such as glass fibers does not exhibit sufficient sound absorbability when used as a sound absorbing material;
(2) For such a nonwoven fabric consisting of inorganic fibers, reducing the fiber diameter of the inorganic fibers causes an increase in the absorbability for sounds in a wide frequency range from low to high frequencies. However, resonance, which reduces the sound absorbability, causes a new problem: sufficient absorbability for sounds, in particular, in an intermediate frequency range (from 500 Hz to 1600 Hz) cannot be achieved; and
(3) It is general knowledge that using a material having a relatively low elasticity modulus to form fibers or to coat fibers increases the sound absorbability. However, even with the use of such a material having a relatively low elasticity modulus, resonance, which reduces the sound absorbability, causes the new problem that sufficient absorbability for sounds in the intermediate frequency range (from 500 Hz to 1600 Hz) cannot be achieved.

It is therefore an object of the present invention to provide a sound absorbing material which achieves sufficient absorbability for sounds in a wide frequency range from low to high frequencies, in particular, sounds in the intermediate frequency range (from 500 Hz to 1600 Hz).

Solution to the Problem

A sound absorbing material of the present invention includes a fiber group of inorganic fibers, a fiber group of organic fibers, or a fiber group of a fiber blend including the inorganic and organic fibers.

In the fiber group, at least junctions between the fibers are coated with a polymeric coating film having a loss factor of 0.1 or more.

Advantages of the Invention

The sound absorbing material of the present invention has sufficient absorbability for sounds in a wide frequency range from low to high frequencies, in particular, sounds in an intermediate frequency range.

The sound absorbing material of the present invention is also highly thermally insulating.

DESCRIPTION OF EMBODIMENTS

A sound absorbing material of the present invention includes a fiber group of inorganic fibers, a fiber group of organic fibers, or a fiber group of a fiber blend including the inorganic and organic fibers. To achieve further improvement of sound absorbability, in particular, absorbability for sounds in an intermediate frequency range, the sound absorbing material preferably includes a fiber group consisting of inorganic fibers.

All inorganic fibers used in the field of sound absorbing material can be used as the inorganic fibers for the sound absorbing material of the present invention. Examples of the inorganic fibers include glass fibers, carbon fibers, and a fiber blend thereof.

All organic fibers used in the field of sound absorbing material can be used as the organic fibers for the sound absorbing material of the present invention. Examples of the organic fibers include polyester fibers, polyamide fibers, polyacrylic fiber, polyethylene fibers, and a fiber blend thereof.

The fiber group for the present invention may be embodied in, but not particularly limited to, the form of a nonwoven fabric, a woven fabric, or a knitted fabric, for example. To achieve further improvement of the sound absorbability, the form of a nonwoven fabric is preferable. A nonwoven fabric refers to a sheet-shaped fiber group including relatively short fibers which are entangled or joined together in random orientation. To achieve further improvement of the sound absorbability, the nonwoven fabric preferably includes fibers entangled together. This is because adopting a nonwoven fabric comprised of fibers simply entangled together and joining (bonding) the fibers of the nonwoven fabric together with a polymeric coating film which will be described later further improves the sound absorbability, in particular, the absorbability for sounds in the intermediate frequency range.

The fibers constituting the fiber group may have any average fiber diameter. The average fiber diameter normally ranges from 1 μm to 100 μm. To achieve further improvement of the sound absorbability, the average fiber diameter is preferably within the range from 1 μm to 20 μm.

The fibers forming the nonwoven fabric may have any average fiber length. The average fiber length normally ranges from 2 mm to 1000 mm. To achieve further improvement of the sound absorbability, the average fiber length is preferably within the range from 20 mm to 200 mm.

The nonwoven fabric may be produced by any method. Examples of the method include the so-called needlepunching, dry process, wet process, spunbonding, meltblowing, thermobonding, chemical bonding, spun-lacing, stitchbonding, and steam jet process. In one preferred embodiment, the needlepunching is used as the production method.

The mass per unit area of the fiber group is not limited to any particular value, and is suitably within a range in which the fiber group has a percentage of void ranging from 80% to 99.9%, and in particular, from 90% to 99.5%.

A percentage of void refers to a volume content of air, and corresponds to a value measured by a method which will be detailed later.

In the fiber group forming the sound absorbing material of the present invention, at least junctions between the fibers are coated with the polymeric coating film. The expression "the junctions between fibers are coated with a polymeric coating film" means that the intersections (contact points) between the fibers are coated, or bonded together, with the polymeric coating film. Specifically, if the fibers have already been joined together, it is suitable to coat the junctions between the fibers with the polymeric coating film. If the fibers have not yet been joined together, it is suitable to join (or bond) the fibers together with the polymeric coating film.

The expression "at least the junctions between fibers are coated with a polymeric coating film" means that not only the junctions between the fibers, but also at least a portion of the surface of the fiber may be coated with the polymeric coating film. To achieve further improvement of the sound absorbability, it is preferable that not only the junctions between the fibers, but also the entire surface of each fiber are coated with the polymeric coating film.

The polymeric coating film has a loss factor of 0.1 or more. To achieve further improvement of the sound absorbability, in particular, the absorbability for sounds in the intermediate frequency range, the loss factor of the polymeric coating film is preferably 0.2 or more, more preferably 0.3 or more, and still more preferably 0.5 or more. The upper limit of the loss factor of the polymeric coating film is not limited to any particular value. The upper limit is normally set to be 5, and in particular, 3. It is presumed that coating with the polymeric coating film having such characteristics reduces resonance, that sound vibration energy is effectively converted into heat due to internal loss, and that consequently, sufficient absorbability can be achieved for sounds in a wide frequency range from low to high frequencies, in particular, for sounds in the intermediate frequency range. Coating with a polymeric coating film having an excessively small loss factor cannot achieve sufficient sound absorbability.

The polymeric coating film may be made of any material (e.g., a coating material) as long as the loss factor of the polymeric coating film is within the range described above. For example, the polymeric coating film may be made of a thermosetting material such as a thermosetting polymer and a thermosetting elastomer.

A thermosetting polymer refers to a polymer which forms a three dimensional mesh structure by being heated, together with a curing agent if desired.

A thermosetting elastomer refers to a polymer which forms a three dimensional mesh structure and becomes elastic by being heated, together with a curing agent (a cross-linking agent) if desired.

A coating material such as a commercially available coating or adhesive may be used as such a thermosetting material.

Examples of the commercially available coatings include urethane-based coatings, polyvinyl chloride (PVC)-based coatings, silicone-based coatings, and epoxy-based coatings.

Examples of the commercially available adhesives include urethane-based adhesives, PVC-based adhesives, silicone-based adhesives, and epoxy-based adhesives.

To achieve further improvement of the sound absorbability, the urethane- and PVC-based coatings and the urethane- and PVC-based adhesives are preferably used as the thermosetting material, and the urethane-based coatings and the urethane-based adhesives are more preferably used as the thermosetting material.

The loss factor as used herein refers to the loss factor of a polymeric coating film having a thickness of 100 μm, measured at a measurement frequency of 10 Hz and a measurement temperature of 23° C. The measurement method will be described later.

In producing the polymeric coating film of the present invention, every coating material (commercially available product) described above cannot always be used as it is. It is suitable to select a thermosetting material or a coating material (commercially available product) which results in a loss factor within a predetermined range, and to form the polymeric coating film using the selected material.

For example, suppose that a coating liquid A from which a polymeric coating film having a loss factor within the predetermined range can be formed is used. The coating liquid A is applied to a fiber group, and then heated, dried, and cured. In this manner, a polymeric coating film can be formed.

Examples of materials usable as the coating liquid A include W-222 (a urethane-based adhesive manufactured by THE YOKOHAMA RUBBER CO., LTD.), #1551A (a PVC-based adhesive manufactured by Sunstar Engineering Inc.), SH3400M (a urethane coating manufactured by ASM), and SH3400S (a urethane coating manufactured by ASM). These adhesives and coatings may be of one-component type or two-component type. Usually, the one-component type is used.

To achieve further improvement of the sound absorbability, the coating liquid A preferably contains polyrotaxane. The content of polyrotaxane usually ranges from 5% to 50% by mass, and in particular from 5% to 20% by mass with respect to the solids content of the coating liquid A. Polyrotaxane may form chemical bonds with the polymer molecules constituting the polymeric coating film, or may be dispersed in the polymeric coating film, without forming chemical bonds. This is applicable to a case where a coating liquid B contains polyrotaxane, which will be described later.

For example, it is conceivable to use the coating liquid B from which only polymeric coating films having a loss factor smaller than the predetermined range can be formed. In such a case, blending and dispersing a loss factor increaser with and in the coating liquid B enable the loss factor of the resultant polymeric coating film to be controlled within the predetermined range. Specifically, following the application of the coating liquid B containing the loss factor increaser to the fiber group, the fiber group is heated and dried to cure the coating liquid B, thereby forming a polymeric coating film. The loss factor increaser is a material which can increase a loss factor. Examples of the loss factor increaser include a ground product of a polymeric coating film (cured product) having a loss factor within the predetermined range, and polyrotaxane. An average particle size of the ground product is usually 5 μm or less, and preferably within the range from 10 nm to 1000 nm. The content of the loss factor increaser is not limited to a particular value as long as the loss factor of the resultant polymeric coating film can be controlled within the predetermined range. For example, the content of the loss factor increaser is set to be from 10% to 100% by mass, and in particular, from 20% to 60% by mass, with respect to the solids content of the coating liquid B. If the coating liquid B contains the ground product, the ground product is usually dispersed in the polymeric coating film, without forming chemical bonds with the polymer molecules constituting the polymeric coating film.

Examples usable as the coating liquid B include R2250 (a urethane coating manufactured by NIPPON BEE CHEMICAL CO., LTD.).

To achieve further improvement of the sound absorbability, it is preferable to use the coating liquid A to form the polymeric coating film.

The coating liquids A and B may contain one or more additives such as a pigment, a dye, a disperser, an emulsifier, an UV absorber, an antifoaming agent, a thickener, a leveling agent, a plasticizer, a coupling agent, a water repellent, a moisture absorbent, an antimicrobial agent, and a deodorant.

The present invention does not exclude formation of the polymeric coating film from a thermoplastic material such as a thermoplastic polymer. However, a thermoplastic polymer usually has a loss factor smaller than 0.1. It is therefore necessary to blend and disperse a loss factor increaser with and in the thermoplastic polymer to control the loss factor of the resultant polymeric coating film within the predetermined range, just like the above-described case of the coating liquid B. In the case where a thermoplastic polymer is used, heating is performed to simply dry the thermoplastic polymer. A thermosetting polymer refers to a polymer which is softened and melted by being heated, and which is then cured by being cooled.

The present invention is not limited to any particular method of applying a coating liquid, any particular solids concentration, or any particular heating condition, as long as a polymeric coating film having a predetermined loss factor can be formed on the surfaces of fibers.

Any application method can be used in the present invention. Examples of the usable application methods include dipping and spraying. In one preferred embodiment, the fiber group is impregnated with the coating liquid by dipping.

As the solids concentration of a coating liquid increases, a coating mass of the resultant polymeric coating film increases. An excessive coating mass reduces the percentage of void of the sound absorbing material and prevents weight reduction of the sound absorbing material. The solids concentration of a coating liquid is usually within the range from 0.1% to 40% by mass, preferably from 0.5% to 30% by mass, and more preferably from 8% to 25% by mass.

The heating condition is set as follows: usually at a temperature from 80° C. to 180° C., preferably from 85° C. to 170° C., and for a duration of 2 to 6 hours, preferably from 4 to 5.5 hours. If a moisture curable material or the like is used, heating does not have to be carried out.

The sound absorbability improves with increase in the coating amount of the polymeric coating film on a fiber group. However, an excessive coating amount prevents weight reduction of the sound absorbing material. The coating amount of a polymeric coating film usually ranges from 5% to 90% by mass with respect to a fiber group. To achieve further improvement of the sound absorbability and weight reduction of the sound absorbing material, the coating amount is preferably within the range from 8% to 85% by mass, more preferably within the range from 15% to 85% by mass, and still more preferably within in the range from 40% to 85% by mass.

The percentage of void of the sound absorbing material is substantially equivalent to or slightly smaller than that of the fiber group coated with the polymer coating film. The percentage of void of the sound absorbing material ranges usually from 70% to 99.9%, in particular, from 80% to 99.5%.

If it is desired that the sound absorbing material of the present invention be in the form of a nonwoven fabric, the fiber group needs to be formed into a nonwoven fabric prior to or at the same time as the formation of the polymeric coating film, for the following reason. If the fiber group is formed into a nonwoven fabric by needlepunching after the formation of the polymeric coating film, the junctions between the fibers coated with the polymeric coating film are destroyed, and the improvement of the sound absorbing material of the present invention becomes unachievable.

EXAMPLES

In the following examples, the physical properties were measured in the manner described below.

(a) Percentage of Void

The mass of each material was measured with Electrobalance AE160 manufactured by METTLER TOLEDO, prior to coating process. A percent of void (a volume content of air in a sample material) was calculated from the specific gravity of the material and the volume of a test specimen.

(b) Loss Factor (Tan δ)

A 100 μm thick film was formed from each of the coating liquids shown in Tables 1-3. Each film was cut into sample slips in a size of 5 mm×30 mm, which were used as measurement specimens. The measurements were carried out with Dynamic viscoelasticity measurement device DVA-220 manufactured by IT Keisoku Seigyo Kabushiki Kaisha, at a measurement frequency of 10 Hz and a programming rate of 2° C./minute. In this manner, a value tan δ at a measurement temperature of 23° C. was determined for each measurement specimen.

(c) Coating Amount of Polymeric Coating Film

The mass of each example was measured with Electrobalance AE160 manufactured by METTLER TOLEDO, before and after the coating process, and a coating amount was calculated. The coating amount was calculated according to the expression (X−Y)/X, where X represents the mass after the coating process, and Y represents the mass before the coating process.

(d) Sound Absorption Coefficient (α)

Normal incident sound absorption coefficients were measured with Normal incident sound absorption coefficient measurement system WinZacMTX manufactured by Nihon Onkyo Engineering Co., Ltd., using a sound tube having an inside diameter of 40 mm and a measurement frequency range from 200 Hz to 4800 Hz (⅓ octave band) (in conformity with JIS A 1405-2 and ISO 10534-2). The average normal incident sound absorption coefficient of sounds within the range from 500 Hz to 1600 Hz was calculated for each example. An increase rate with respect to the sound absorption coefficient in a state where no polymeric coating film was formed was also calculated.

Examples A1-A4

Glass wool having an average fiber diameter of 7 μm to 8 μm was formed into a sheet by needlepunching, thereby preparing a nonwoven fabric (A) having a percentage of void of 96% and a thickness of 10 mm Cylindrical nonwoven pieces (B) each having a diameter of 40 mm and a thickness of 10 mm were cut out from the nonwoven fabric (A), and the mass of the cylindrical nonwoven pieces (B) was measured with the electrobalance. Next, the coating materials shown in Table 1 were each diluted with toluene to a solids concentration of 10%, thereby preparing coating liquids. The cylindrical nonwoven pieces (B) were dipped into the coating liquids to allow the coating liquids to fully penetrate the voids in the cylindrical nonwoven pieces (B). The cylindrical nonwoven pieces (B) were taken out of the coating liquids and placed in a hot-air drying oven, where the cylindrical nonwoven pieces (B) were heated under the respective curing conditions shown in Table 1, thereby drying and curing the coating liquids. Thereafter, the cylindrical nonwoven pieces (B) were removed from the hot-air drying oven, and further left at room temperature for seven days. In this manner, sound absorption coefficient test specimens (C) each including fibers bonded together at their intersections with the respective polymeric coating film were prepared. Following the measurement of the mass of each sound absorption coefficient test specimen (C), it was confirmed, with a scanning electron microscope, that the polymeric coating film bonded the fibers together at the intersections. Table 1 also shows results of the measurement of sound absorption coefficient.

Examples B1-B6

Glass wool having an average fiber diameter of 3 μm to 4 μm was formed into a sheet by needlepunching, thereby preparing a nonwoven fabric (D) having a percentage of void of 98% and a thickness of 10 mm Cylindrical nonwoven pieces (E) each having a diameter of 40 mm and a thickness of 10 mm were cut out from the nonwoven fabric (D), and the mass of the cylindrical nonwoven pieces (E) was measured with the electrobalance. Next, the coating materials shown in Table 2 were each diluted with toluene to the respective solids concentrations shown in Table 2, thereby preparing coating liquids. The cylindrical nonwoven pieces (E) were dipped into the coating liquids to allow the coating liquids to fully penetrate the voids in the cylindrical nonwoven pieces (E). The cylindrical nonwoven pieces (E) were taken out of the coating liquids and placed in a hot-air drying oven, where the cylindrical nonwoven pieces (E) were heated under the curing condition shown in Table 2, thereby drying and curing the coating liquids. Thereafter, the cylindrical nonwoven pieces (E) were removed from the hot-air drying oven, and further left at room temperature for seven days. In this manner, sound absorption coefficient test specimens (F) each including fibers bonded together at their intersections with the respective polymeric coating film were prepared. Following the measurement of the mass of each sound absorption coefficient test specimen (F), it was confirmed, with a scanning electron microscope, that the polymeric coating film bonded the fibers together at the intersections. Table 2 also shows results of the measurement of sound absorption coefficient.

Example B7

The urethane coating B was applied, with a blade, to a steel sheet coated with a mold release agent. In a hot-air drying oven, the urethane coating B was cured at 160° C. for one hour, thereby preparing a film (G) having a thickness of 100 μm. The film (G) was ground to powder. The powder was dispersed in toluene and mixed and pulverized for 10 minutes using a disperser. The toluene was then filtered through Grade 5C filter paper specified according to JIS P 3801. The resultant dispersion was dried and cured, thereby preparing elastomer particles (H) having a particle size of 1 μm or less. The elastomer particles (H) in an amount of 0.6 g were added to 39.4 g of the diluted urethane coating C having a solids concentration of 3.7%. The resultant mixture was agitated with a disperser for 30 minutes to prepare a coating liquid. Thereafter, the cylindrical nonwoven piece (E) was dipped into the coating liquid to allow the coating liquid to fully penetrate the voids in the cylindrical nonwoven piece (E). The cylindrical nonwoven piece (E) was taken out of the coating liquid and placed in a hot-air drying oven, where the cylindrical nonwoven piece (E) were heated under the curing condition shown in Table 2, thereby drying and curing the coating liquid. Thereafter, the cylindrical nonwoven piece (E) was removed from the hot-air drying oven, and further left at room temperature for seven days. In this manner, a sound absorption coefficient test specimen (I) including fibers bonded together at their intersections with the polymeric coating film was prepared. Following the measurement of the mass of the sound absorption coefficient test specimen (I), it was confirmed, with a scanning electron microscope, that the polymeric coating film bonded the fibers together at the intersections. Table 2 also shows results of the measurement of sound absorption coefficient.

Example C1

PET fibers having a fiber length of 51 mm and a size of 2.2 denier were formed into a sheet by needlepunching, thereby preparing a nonwoven fabric (J) having a percentage of void of 96% and a thickness of 5 mm Cylindrical nonwoven pieces (K) having a diameter of 40 mm and a thickness of 5 mm were cut out from the nonwoven fabric (J), and the mass of the cylindrical nonwoven pieces (K) was measured with the electrobalance. Next, the coating material shown in Table 3 was diluted with toluene to a solids concentration of 10%, thereby preparing a coating liquid. The cylindrical nonwoven pieces (K) were dipped into the coating liquid to allow the coating liquid to fully penetrate the voids in the cylindrical nonwoven pieces (K). The cylindrical nonwoven pieces (K) were taken out of the coating liquid and placed in a hot-air drying oven, where the cylindrical nonwoven pieces (K) were heated under the curing condition shown in Table 3, thereby drying and curing the coating liquid. Thereafter, the cylindrical nonwoven pieces (K) were removed from the hot-air drying oven, and further left at room temperature for seven days. In this manner, sound absorption coefficient test specimens (L) including fibers bonded together at their intersections with the polymeric coating film were prepared. Following the measurement of the mass of the sound absorption coefficient test specimens (L), it was confirmed, with a scanning electron microscope, that the polymeric coating film bonded the fibers together at the intersections. Two sound absorption coefficient test specimens (L) were superimposed together and the sound absorption coefficient was measured. The measurement result is also shown in Table 3.

Comparative Example A1

Glass wool having an average fiber diameter of 7 μm to 8 μm was formed into a sheet by needlepunching, thereby preparing a nonwoven fabric (A) having a percentage of void of 96% and a thickness of 10 mm. A cylindrical nonwoven piece (B) having a diameter of 40 mm and a thickness of 10 mm was cut out from the nonwoven fabric (A), and the mass of the cylindrical nonwoven piece (B) was measured with the electrobalance. Thereafter, the sound absorption coefficient of the cylindrical nonwoven piece (B) was measured. The measurement result is shown in Table 1.

Comparative Example A2

The coating material shown in Table 1 was diluted with toluene to a solids concentration of 10%, thereby preparing a coating liquid. Glass wool having an average fiber diameter from 7 μm to 8 μm was dipped into the coating liquid. The dipped glass wool was placed in a hot-air drying oven such that the fibers of the glass wool did not overlap with each other. The glass wool was then heated under the curing condition shown in Table 1, thereby drying and curing the coating liquid covering the surfaces of the fibers. Thereafter, the glass wool was removed from the hot-air drying oven, and further left at room temperature for seven days. In this manner, glass wool (M) having the fibers coated with the polymeric coating film was prepared. The glass wool (M) was formed into a sheet by needlepunching, thereby preparing a nonwoven fabric (N) having a percentage of void of 96% and a thickness of 10 mm A cylindrical nonwoven piece (O) having a diameter of 40 mm and a thickness of 10 mm was cut out from the nonwoven fabric (N), and the mass of the cylindrical nonwoven piece (O) was measured with the electrobalance. Thereafter, the sound absorption coefficient of the cylindrical nonwoven piece (O) was measured. The measurement result is shown in Table 1. Through the observation of the cylindrical nonwoven piece (O) with a scanning electron microscope, it was confirmed that the polymeric coating film did not bond the fibers at the intersections.

Comparative Example B1

Glass wool having an average fiber diameter of 3 μm to 4 μm was formed into a sheet by needlepunching, thereby preparing a nonwoven fabric (D) having a percentage of void of 98% and a thickness of 10 mm A cylindrical nonwoven piece (E) having a diameter of 40 mm and a thickness of 10 mm was cut out from the nonwoven fabric (D), and the mass of the cylindrical nonwoven piece (E) was measured with the electrobalance. Thereafter, the sound absorption coefficient of the cylindrical nonwoven piece (E) was measured. The measurement result is shown in Table 2.

Comparative Example B2

Glass wool having an average fiber diameter of 3 μm to 4 μm was formed into a sheet by needlepunching, thereby preparing a nonwoven fabric (D) having a percentage of void of 98% and a thickness of 10 mm A cylindrical nonwoven piece (E) having a diameter of 40 mm and a thickness of 10 mm was cut out from the nonwoven fabric (D), and the mass of the cylindrical nonwoven piece (E) was measured with the electrobalance. Next, the coating material shown in Table 2 was diluted to a solids concentration of 5%, thereby preparing a coating liquid. The cylindrical nonwoven piece (E) was dipped into the coating liquid to allow the coating liquid to fully penetrate the voids in the cylindrical nonwoven piece (E). The cylindrical nonwoven piece (E) was taken out from the coating liquid and placed in a hot-air drying oven, where the cylindrical nonwoven piece (E) was heated under the curing condition shown in Table 2, thereby drying and curing the coating liquid. Thereafter, the cylindrical nonwoven piece (E) was removed from the hot-air drying oven, and further left at room temperature for seven days. In this manner, sound absorption coefficient test specimen (P) including fibers bonded together at their intersections with the polymeric coating film was prepared. Following the measurement of the mass of the sound absorption coefficient test specimen (P), it was confirmed, with a scanning electron microscope, that the polymeric coating film bonded the fibers together at the intersections. Table 2 also shows results of the measurement of sound absorption coefficient.

Comparative Example C1

PET fibers having a fiber length of 51 mm and a size of 2.2 denier were formed into a sheet by needlepunching, thereby preparing a nonwoven fabric (J) having a percentage of void of 96% and a thickness of 5 mm Cylindrical nonwoven pieces (K) having a diameter of 40 mm and a thickness of 5 mm were cut out from the nonwoven fabric (J), and the mass of the cylindrical nonwoven pieces (K) was measured with the electrobalance. Two cylindrical nonwoven pieces (K) were superimposed together, and the sound absorption coefficient was measured. The measurement result is shown in Table 3.

TABLE 1

| | | Example | | | | Comparative Example | |
|---|---|---|---|---|---|---|---|
| | | A1 | A2 | A3 | A4 | A1 | A2 |
| Fiber | Type of Material | | | Glass Wool A | | | |
| | Percentage of Void | | | 96% | | | |
| Nonwoven Fabric Formation 1 | | | | Needlepunching | | | |
| Coating Liquid | Coating Material | Urethane-Based Adhesive | PVC-Based Adhesive | Urethane Coating A | Urethane Coating B | — | Urethane-Based Adhesive |
| | Solids Content | 10% | 10% | 10% | 10% | — | 10% |
| | tanδ | 0.1 | 0.3 | 0.6 | 1 | — | 0.1 |
| | Application Process | Dipping after formation of nonwoven fabric | Dipping after formation of nonwoven fabric | Dipping after formation of nonwoven fabric | Dipping after formation of nonwoven fabric | — | Dipping before formation of nonwoven fabric |

TABLE 1-continued

| | | Example | | | | Comparative Example | |
|---|---|---|---|---|---|---|---|
| | | A1 | A2 | A3 | A4 | A1 | A2 |
| Curing | | Drying at 90° C. for 5 hours, followed by drying at room temperature for 7 days | Drying at 160° C. for 5 hours, followed by drying at room temperature for 7 days | Drying at 160° C. for 5 hours, followed by drying at room temperature for 7 days | Drying at 160° C. for 5 hours, followed by drying at room temperature for 7 days | — | Drying at 90° C. for 5 hours, followed by drying at room temperature for 7 days |
| Coating Amount of Polymeric Coating Film | | 35% by mass | 32% by mass | 30% by mass | 28% by mass | — | 32% by mass |
| Nonwoven Fabric Formation 2 | | | | — | | | Needlepunching |
| Thickness of Nonwoven Fabric | | | | 10 mm | | | |
| Sound Absorption Coefficient in Range of 500-1600 Hz (Increase Rate) | | 0.149 (8.0%) | 0.151 (9.4%) | 0.153 (10.9%) | 0.155 (12.3%) | 0.138 (—) | 0.138 (0) |

TABLE 2

| | | Example | | | | | | | Comparative Example | |
|---|---|---|---|---|---|---|---|---|---|---|
| | | B1 | B2 | B3 | B4 | B5 | B6 | B7 | B1 | B2 |
| Fiber | Type of Material | Glass Wool B | | | | | | | | |
| | Percentage of Void | 98% | | | | | | | | |
| Nonwoven Fabric Formation 1 | | Needlepunching | | | | | | | | |
| Coating Liquid | Coating Material | Urethane Coating B | | | | | | Urethane Coating C + Elastomer Particles | — | Urethane Coating C |
| | Solids Content | 0.6% | 1% | 3% | 5% | 10% | 20% | 5% | — | 5% |
| | tanδ | | | 1 | | | | 0.3 | | 0.05 |
| | Application Process | Dipping after formation of nonwoven fabric | | | | | | Dipping after formation of nonwoven fabric | — | Dipping after formation of nonwoven fabric |
| | Curing | Drying at 160° C. for 5 hours, followed by drying at room temperature for 7 days | | | | | | Drying at 100° C. for 5 hours, followed by drying at room temperature for 7 days | — | Drying at 100° C. for 5 hours, followed by drying at room temperature for 7 days |
| | Coating Amount of Polymeric Coating Film | 9% by mass | 17% by mass | 30% by mass | 48% by mass | 66% by mass | 80% by mass | 66% by mass | — | 68% by mass |
| Nonwoven Fabric Formation 2 | | | | | | | | — | | |
| Thickness of Nonwoven Fabric | | | | | | | | 10 mm | | |
| Sound Absorption Coefficient in Range of 500-1600 Hz (Increase Rate) | | 0.271 (3.0%) | 0.288 (9.5%) | 0.294 (11.8%) | 0.309 (17.5%) | 0.341 (29.7%) | 0.413 (57.0%) | 0.290 (10.3%) | 0.263 (—) | 0.264 (0.4%) |

TABLE 3

| | | Example C1 | Comparative Example C1 |
|---|---|---|---|
| Fiber | Type of Material | PET Nonwoven Fabric | |
| | Percentage of Void | 96% | |
| Nonwoven Fabric Formation 1 | | Needlepunching | |
| Coating Liquid | Coating Material | Urethane Coating B | — |
| | Solids Content | 10% | — |
| | tanδ | 1 | — |
| | Application Process | Dipping after formation of nonwoven fabric | — |
| | Curing | Drying at 160° C. for 5 hours, followed by drying at room temperature for 7 days | — |
| | Coating Amount of Polymeric Coating Film | 25% by mass | — |
| Nonwoven Fabric Formation 2 | | — | — |
| Thickness of Nonwoven Fabric | | 5 mm × 2 pieces | 5 mm × 2 pieces |
| Sound Absorption Coefficient in Range of 500-1600 Hz (Increase Rate) | | 0.163 (10.1%) | 0.148 (—) |

The materials shown in Tables 1-3 are as follows:

Glass wool A: Glass fibers having an average fiber diameter of 7 μm to 8 μm and a fiber length of 30 mm to 150 mm Glass wool B: Glass fibers having an average fiber diameter of 3 μm to 4 μm and a fiber length of 30 mm to 150 mm PET nonwoven fabric: PET fibers having a fiber length of 51 mm and a size of 2.2 denier (a fiber diameter of about 16 μm)

Urethane-based adhesive (a moisture curable polymer) W-222 (a product of THE YOKOHAMA RUBBER CO., LTD.); with a polyrotaxane content of 0% by mass PVC-based adhesive (a thermosetting elastomer): #1551A (a product of Sunstar Engineering Inc.); with a polyrotaxane content of 0% by mass Urethane coating A (a thermosetting elastomer): SH3400M (a product of ASM); with a polyrotaxane content of 5% to 20% by mass with respect to solids content of the coating Urethane coating B (a thermosetting elastomer): SH3400S (a product of ASM); with a polyrotaxane content of 5% to 20% by mass with respect to solids content of the coating Urethane coating C (a thermosetting polymer): R2250 (a product of NIPPON BEE CHEMICAL CO., LTD.); with a polyrotaxane content of 0% by mass Elastomer particles: Particles prepared by curing and grinding the urethane coating B

INDUSTRIAL APPLICABILITY

The sound absorbing material of the present invention is useful as a sound absorbing material configured to be attached to walls, a floor, and a ceiling of a vehicle such as an automobile and a train.

The invention claimed is:

1. A sound absorbing material comprising:
a fiber group of inorganic fibers, a fiber group of organic fibers, or a fiber group of a fiber blend including the inorganic and organic fibers, wherein
in the fiber group, at least junctions between the fibers are coated with a polymeric coating film, and
a loss factor of the polymeric coating film, measured on the polymeric coating film having a thickness of 100 μm at a measurement frequency of 10 Hz and a measurement temperature of 23° C., is 0.1 or more.

2. The sound absorbing material of claim 1, wherein
in the fiber group, the junctions between the fibers and surfaces of the fibers are coated with the polymeric coating film.

3. The sound absorbing material of claim 1, wherein the polymeric coating film is made of a thermosetting polymer or a thermosetting elastomer.

4. The sound absorbing material of claim 1, wherein the polymeric coating film includes polyrotaxane.

5. The sound absorbing material of claim 1, wherein the fiber group is in a form of nonwoven fabric.

6. The sound absorbing material of claim 1, wherein the fiber group includes inorganic fibers of at least one type selected from the group consisting of glass fibers and carbon fibers.

7. The sound absorbing material of claim 1, wherein the fiber group includes organic fibers of at least one type selected from the group consisting of polyester fibers, polyamide fibers, polyacrylic fibers, and polyethylene fibers.

8. The sound absorbing material of claim 1, wherein a coating amount of the polymeric coating film ranges from 5% to 90% by mass with respect to the fiber group.

9. A method for producing the sound absorbing material of claim 1, the method comprising:
applying, to the fiber group, a coating liquid configured to form the polymeric coating film having a loss factor of 1.0 or more; and
carrying out heating after the applying the coating liquid.

10. The sound absorbing material of claim 2, wherein the polymeric coating film is made of a thermosetting polymer or a thermosetting elastomer.

11. The sound absorbing material of claim 2, wherein the polymeric coating film includes polyrotaxane.

12. The sound absorbing material of claim 3, wherein the polymeric coating film includes polyrotaxane.

13. The sound absorbing material of claim 2, wherein the fiber group is in a form of nonwoven fabric.

14. The sound absorbing material of claim 3, wherein the fiber group is in a form of nonwoven fabric.

15. The sound absorbing material of claim 4, wherein the fiber group is in a form of nonwoven fabric.

16. The method of claim 9, wherein
the coating liquid contains polyrotaxane, and
a content of the polyrotaxane in the coating liquid is 5% by mass to 20% by mass with respect to solids content of the coating liquid.

17. The sound absorbing material of claim 1, wherein the fiber group has a percentage of void ranging from 80% to 99.9%.

18. The sound absorbing material of claim 1, wherein the sound absorbing material has a percentage of void ranging from 70% to 99.9%.

19. The sound absorbing material of claim 1, wherein the fiber group has an average fiber diameter of 1 μm to 20 μm.

20. The sound absorbing material of claim 1, wherein the fiber group has an average fiber length of 2 mm to 200 mm.

* * * * *